(No Model.)
J. PECKOVER.
SAW BLADE FOR STONE SAWING MACHINES.
No. 579,721.  Patented Mar. 30, 1897.
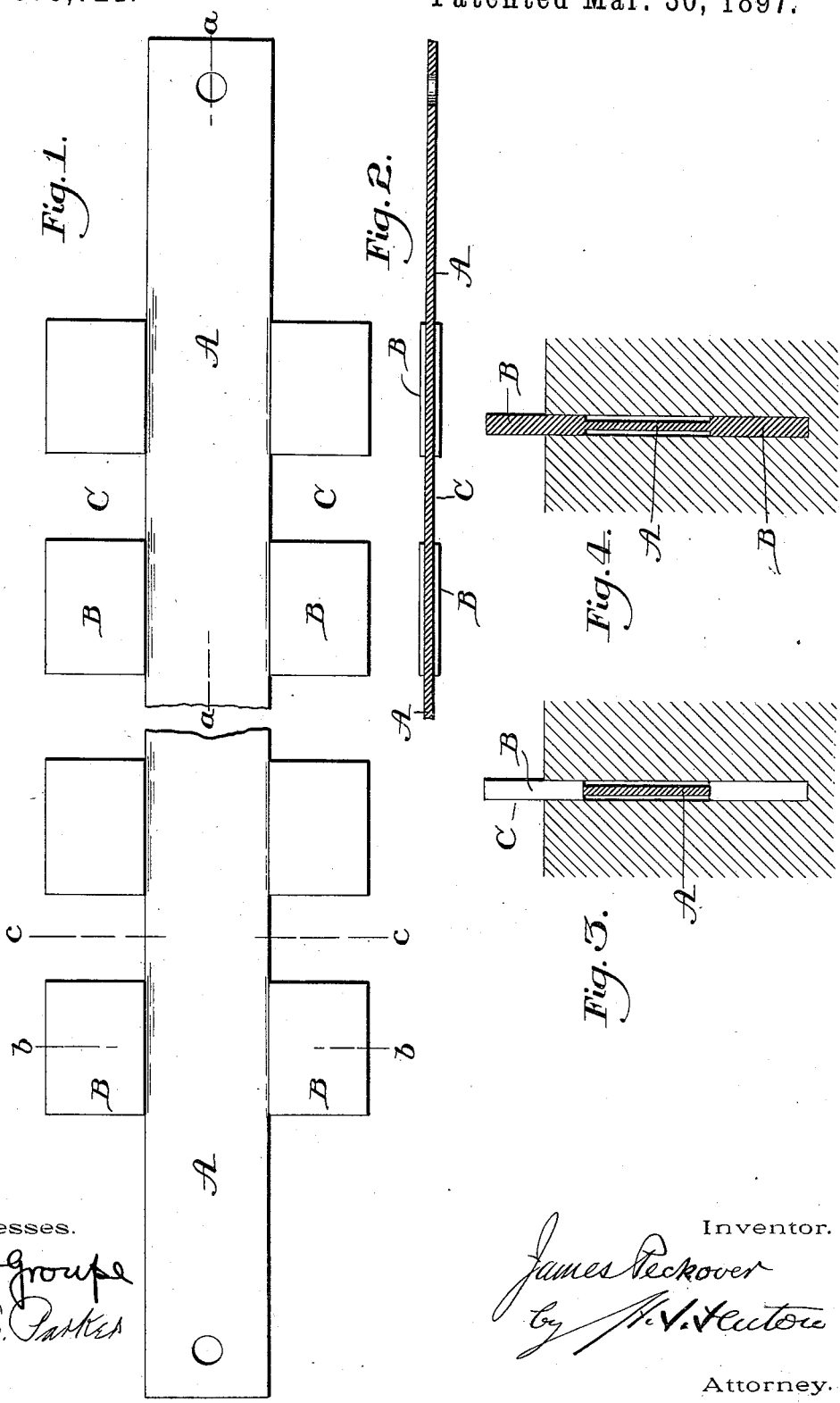
Witnesses.
A. V. Groupe
C. E. Parker
Inventor.
James Peckover
by
Attorney.

UNITED STATES PATENT OFFICE.

JAMES PECKOVER, OF PHILADELPHIA, PENNSYLVANIA, ASSIGNOR TO THE RAPID STONE SAW COMPANY, OF NEW JERSEY.

SAW-BLADE FOR STONE-SAWING MACHINES.

SPECIFICATION forming part of Letters Patent No. 579,721, dated March 30, 1897.

Application filed February 10, 1897. Serial No. 622,751. (No model.)

*To all whom it may concern:*

Be it known that I, JAMES PECKOVER, a citizen of the United States, residing in the city of Philadelphia, State of Pennsylvania, have invented certain new and useful Improvements in Saw-Blades for Stone-Sawing Machines, of which the following is a full, clear, and exact description, reference being had to the accompanying drawings, forming a part of this specification.

My invention relates to mechanical devices for sawing blocks of stone; and it consists of an improved saw-blade adapted to be used in stone-sawing machines of that class in which the saw-blade is reciprocated horizontally.

In the accompanying drawings, illustrating my invention, Figure 1 is a side elevation, broken away in the center in the direction of its length, illustrating a stone-sawing blade embodying my invention. Fig. 2 is a lateral sectional view thereof through the line $a\,a$ of Fig. 1. Fig. 3 is a section through the line $c\,c$ of Fig. 1, and Fig. 4 is a section through the line $b\,b$ of Fig. 1.

Several prior Letters Patent have been heretofore granted from time to time describing stone-sawing machines to which the saw-blade embodying my present invention in whole or in part is applicable, and of these prior machines I may refer to Letters Patent granted to me dated June 20, 1893, No. 500,034, as describing such a machine in which the saw-blade is reciprocated horizontally—that is to say, in the direction of its length—and to which said character of saw-blade my present invention applies.

My invention in horizontally-reciprocated saw-blades has for its object to provide a blade which will remain true and steady in the kerf without lateral vibration, which will permit the abrading material to be delivered under and to the cutting or tooth edge only of the saw, and, finally, that will be reversible—that is to say, with teeth or cutting edges on both sides of the blade—and hence have greater length of life.

To these ends my invention consists in a stone-saw blade in which the blade or central portion is thinner than the longitudinal edge or edges, and which said longitudinal edges are serrated or cut away at intervals to form the "teeth," so called, or cutting edges of the saw proper. Ordinarily stone-saw blades as operated in such stone-sawing machines consist of a flat slab of metal with a dull edge, the cutting being by friction of such edge against the stone in the bottom of the kerf. Efforts have been made from time to time to improve the construction, but some of the objections thereto may be stated as follows:

Saws with teeth on one edge only, thicker than the body or blade of the saws, are very faulty because of several causes. First, their excessive weight pendent from the thinner portion causes much vibration, greatest in the middle, decreasing toward the ends, which are held rigidly in position; second, saws with inserted teeth are more objectionable than saws formed with teeth integral with the blade, because if the utmost care is not had in fitting the teeth in the blade they become loose for many reasons and fall out, doing considerable damage to the stone in the cutting process; third, saws with teeth on one edge only are considerably weaker on the side containing the teeth because of the notches cut in it for the formation of the teeth, and hence the side containing the teeth cannot bear as much tensile strain as the solid edge or blade of the saw; fourth, if the serrated or toothed cutting edge is made thicker than the saw-blade the kerf will naturally be wide enough for the thin blade to wabble in, and this wabbling frequently permits more abrading material to go down on one lateral side of the saw-blade than on the opposite lateral side, and this gradually forces the saw out of the true or straight line, causing the saw to warp or twist in the kerf to such an extent that the thinner portion of the saw will eventually rub against the wall of the kerf, reducing the effectiveness of the saw by the friction until its usefulness as a stone-saw is destroyed.

The object of my invention is to eliminate these errors as much as possible. First, by making a saw with teeth or notches on both sides and of uniform thickness throughout, which assures a uniform tension; second, constructing the saw with serrated cutting edges or teeth thicker than the middle or blade portion in order that the inverted teeth on the upper cutting edge will so nearly fill the kerf made by the lower (cutting) teeth that there is not much room for them to wabble in; third, because the abrading material fills the space on either side of the thin central blade so effectually as to prevent any wabbling, and at the same time the relatively thicker upper teeth or serrated cutting edge spread the shot or abrading material through a greater length of kerf, thereby assuring its delivery to the lower teeth in a more uniform and therefore a more satisfactory manner through the medium of the notched spaces forming the teeth, said notches being cut entirely through the thick portion of the saw to the thinner portion; fourth, by reducing the tendency of the saw to vibrate in the kerf I make it possible to increase the length or projection of the toothed edge from the thinner portion of the blade, and therefore the life of the saw is increased in proportion to the increased projection of the serrated or toothed edge, thus increasing its effectiveness and economy in use, and, fifth, in saws embodying my invention the upper teeth greatly increase the quality of the sawed surfaces of the stone by bringing them into a smoother and finer condition than the lower teeth put them in, because of their abrasion laterally against the lateral sides of the kerf cut by the acting or lower teeth of the saw.

In the drawings, A represents a saw-blade, and B B the serrated or toothed edges, formed by slotting or notching the edges, as at C C. I prefer to make the cutting edges integral with the central body or blade portion A for the reasons hereinbefore mentioned. A saw so constructed, as shown in the drawings, it will be understood is removable from and replaceable in the machine, and is adapted to all stone-sawing machines operating on the principle of a horizontally or substantially horizontal reciprocating saw.

By reference to Fig. 2 it will be observed that the toothed edges formed by the teeth B are of a thickness greater than the central body or blade portion A, and it is to be observed that the toothed edges B B on either side of the blade are to be of uniform thickness. I cut the notches or slots C the entire depth of the thickened toothed edge. In other words, the slot C will extend down to the thin central portion or blade A.

By reference to Figs. 3 and 4 it will be observed that the abrading material can be delivered to the saw through the slots or notches C on the upper or non-cutting side and will thence fall to the opposite lateral sides of the thin central portion or blade A, and from thence through the notches or slots C on the lower or cutting side of the saw and be delivered thence to the kerf of the stone. When the meanwhile lower cutting edge of the saw becomes worn, the saw can be removed from the machine and replaced in an inverted position—that is to say, with its upper cutting edge downward and against the kerf—and thus economy in use from increased durability results, as well as increased effectiveness of operation, for the several reasons hereinbefore mentioned, and a more regular and a smoother cut edge of stone results.

Having thus described my invention, what I claim as new, and desire to secure by Letters Patent, is—

1. A saw-blade for machines of the character described consisting of a thin central body portion, and relatively thicker cutting-blades on opposite sides thereof, each of the latter being slotted or notched to form serrated or toothed edges; substantially as described.

2. A saw-blade for machines of the character described consisting of a thin central body portion and relatively thicker cutting-blades on opposite sides thereof, each of the latter being slotted or notched the entire depth thereof; substantially as described.

3. A saw-blade for machines of the character described consisting of a central body or blade portion and relatively thicker edge portions on either side thereof, said edge portions being of uniform thickness and one of the same being slotted or notched to form cutting-teeth; substantially as described.

4. A saw-blade for machines of the character described consisting of a central body or blade, a relatively thicker serrated cutting edge integral therewith, on one side of the central body, with means, such as teeth B B, on the opposite side, operating to steady the saw in the kerf; substantially as described.

5. A saw-blade for machines of the character described consisting of a blade or body A, a series of teeth B B of greater relative thickness than the body or blade, and arranged on one side thereof, with means such as other teeth B B and of uniform thickness therewith, arranged on the opposite side of the body or blade A adapted and operating to fill the kerf-space in the stone above the cutting edge; substantially as described.

In testimony whereof I have hereunto affixed my signature this 28th day of January, A. D. 1897.

JAMES PECKOVER.

Witnesses:
 EDWIN W. PRESTON,
 H. T. FENTON.